United States Patent
Gautier, Jr. et al.

(10) Patent No.: US 8,791,012 B2
(45) Date of Patent: Jul. 29, 2014

(54) METHODS AND APPARATUS FOR MANUFACTURING SEMICONDUCTOR DEVICES

(75) Inventors: Stanford Joseph Gautier, Jr., Plano, TX (US); Rabah Mezenner, Richardson, TX (US); Randy Long, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1605 days.

(21) Appl. No.: 11/726,051

(22) Filed: Mar. 21, 2007

(65) Prior Publication Data

US 2008/0230863 A1 Sep. 25, 2008

(51) Int. Cl.
*H01L 21/4763* (2006.01)
*G02B 1/11* (2006.01)
*G02B 26/08* (2006.01)

(52) U.S. Cl.
CPC ............ *G02B 26/0841* (2013.01); *G02B 1/115* (2013.01)
USPC .................................. 438/636; 257/E21.038

(58) Field of Classification Search
USPC .............................. 438/72, 636; 359/290–292
See application file for complete search history.

(56) References Cited

U.S. PATENT DOCUMENTS

| | | | |
|---|---|---|---|
| 5,083,474 A | 1/1992 | Rouverol | |
| 5,271,288 A | 12/1993 | Hayduk et al. | |
| 5,341,699 A | 8/1994 | Rouverol | |
| 5,423,658 A | 6/1995 | Pla et al. | |
| 5,453,943 A | 9/1995 | Magliozzi | |
| 5,661,083 A * | 8/1997 | Chen et al. | 438/637 |
| 5,726,805 A * | 3/1998 | Kaushik et al. | 359/589 |
| 5,789,678 A | 8/1998 | Pla | |
| 5,991,487 A * | 11/1999 | Sugiyama | 385/129 |
| 6,053,617 A | 4/2000 | Kaeriyama | |
| 6,138,947 A | 10/2000 | Welsh et al. | |
| 6,248,448 B1 * | 6/2001 | Lippey et al. | 428/432 |

(Continued)

OTHER PUBLICATIONS

U.S. Appl. No. 11/304,042, filed Dec. 15, 2005 entitled: "*Ultra Dark Polymer*", 29 pages.

(Continued)

*Primary Examiner* — Laura Menz
*Assistant Examiner* — Candice Y Chan
(74) *Attorney, Agent, or Firm* — Warren L. Franz; Frederick J. Telecky, Jr.

(57) ABSTRACT

In accordance with the teachings of the present disclosure, methods and apparatus are provided for a semiconductor device having thin anti-reflective layer(s) operable to absorb radiation that may otherwise reflect off surfaces disposed inwardly from the anti-reflective layer(s). In a method embodiment, a method for manufacturing a semiconductor device includes forming a support structure outwardly from a substrate. The support structure has a first thickness and a first outer sidewall surface that is not parallel with the substrate. The first outer sidewall surface has a first minimum refractive index. The method further includes forming an anti-reflective layer outwardly from the first outer sidewall surface. The anti-reflective layer has: a second outer sidewall surface that is not parallel with the substrate, a second refractive index that is greater than the first minimum refractive index, and a second thickness that is less than the first thickness.

11 Claims, 6 Drawing Sheets

(56) References Cited

U.S. PATENT DOCUMENTS

| | | |
|---|---|---|
| 6,282,010 B1 | 8/2001 | Sulzbach et al. ............ 359/249 |
| 6,295,154 B1 | 9/2001 | Laor et al. |
| 6,379,014 B1 | 4/2002 | Li et al. |
| 6,599,766 B1 | 7/2003 | Tabery et al. |
| 6,798,002 B1 | 9/2004 | Ogle et al. |
| 6,832,973 B1 | 12/2004 | Welsh |
| 6,958,207 B1 | 10/2005 | Khusnatdinov et al. |
| 7,835,062 B2 * | 11/2010 | Ishii et al. .................... 359/295 |
| 2004/0160659 A1 * | 8/2004 | DiCarlo ........................ 359/291 |
| 2006/0245036 A1 | 11/2006 | Neidrich |

OTHER PUBLICATIONS

U.S. Patent Application filed Aug. 2, 2006 entitled: "*Sloping Electrodes in a Spatial Light Modulator*", 23 pages.

"Isolation Layer for Semiconductor Devices and Method for Forming the Same", U.S. Appl. No. 11/110,027; Inventor: Jason M. Neidrich, filed Apr. 20, 2005.

"Manufacturing Optical Mems with Thin-Film Anti-Reflective Layers", U.S. Appl. No. 12/055,419; Inventor: Earl V. Atnip et al., filed Mar. 26, 2008.

* cited by examiner

METHODS AND APPARATUS FOR MANUFACTURING SEMICONDUCTOR DEVICES

TECHNICAL FIELD

This disclosure relates in general to semiconductor devices, and more particularly to optical semiconductor devices having enhanced optical performance and methods of forming the same.

BACKGROUND

Semiconductor devices may be designed to interact with electromagnetic radiation that is incident upon a particular area of the device. One such semiconductor device is a spatial light modulator (SLM), which serves to redirect the path of incoming radiation by action of one or more accepted principles of optics, such as reflection, refraction, or diffraction. Unfortunately, in many of these devices, some incident radiation may not be redirected in the desired manner due to physical gaps, unwanted diffraction, scattering effects, or other phenomena. Such radiation may be deemed "stray radiation," which may degrade the performance of the overall system if a mechanism of absorbing the radiation is not present. Conventional methods of reducing stray radiation are limited for a variety of reasons.

SUMMARY

In accordance with the teachings of the present disclosure, methods and apparatus are provided for a semiconductor device having thin anti-reflective layer(s) operable to absorb radiation that may otherwise reflect off surfaces disposed inwardly from the anti-reflective layer(s). In a method embodiment, a method for manufacturing a semiconductor device includes forming a support structure outwardly from a substrate. The support structure has a first thickness and a first outer sidewall surface that is not parallel with the substrate. The first outer sidewall surface has a first minimum refractive index. The method further includes forming an anti-reflective layer outwardly from the first outer sidewall surface. The anti-reflective layer has: a second outer sidewall surface that is not parallel with the substrate, a second refractive index that is greater than the first minimum refractive index, and a second thickness that is less than the first thickness.

Important technical advantages of certain embodiments of the present disclosure include mitigation or elimination of stray radiation associated with reflective sidewalls and other surfaces of conventional processing through the use of one or more anti-reflective layers. In some embodiments, the relative thinness of the anti-reflective layer(s) may facilitate minimal process perturbations or changes for subsequent levels of DMD processing. Various embodiments may encase reflective sidewalls within one or more anti-reflective layers. In addition, various embodiments may mitigate or even eliminate the effect of stray radiation from metal lines within inwardly disposed substrates by providing an anti-reflective "blanket" over the surface of an interposing dielectric. In addition to potential optical advantages, the anti-reflective layer(s) of various embodiments may provide protection against corrosion and electrical shorts.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

In accordance with the teachings of the present disclosure, methods and apparatus are provided for a semiconductor device having one or more thin anti-reflective layers operable to absorb radiation that may otherwise reflect off surfaces disposed inwardly from the anti-reflective layer(s). Such anti-reflective layer(s) may be utilized in any of a variety of semiconductor devices, such as a spatial light modulator, a variable diffraction grating, a liquid crystal light valve, or other semiconductor device, to reduce the effects of "stray radiation" on the performance of the device. An example of one such device is a microelectromechanical system (MEMS) device in the form of a deformable micromirror device, a subset of which includes digital micromirror devices (DMDs). A portion of a digital micromirror device is illustrated in FIG. 1.

Figure 1:
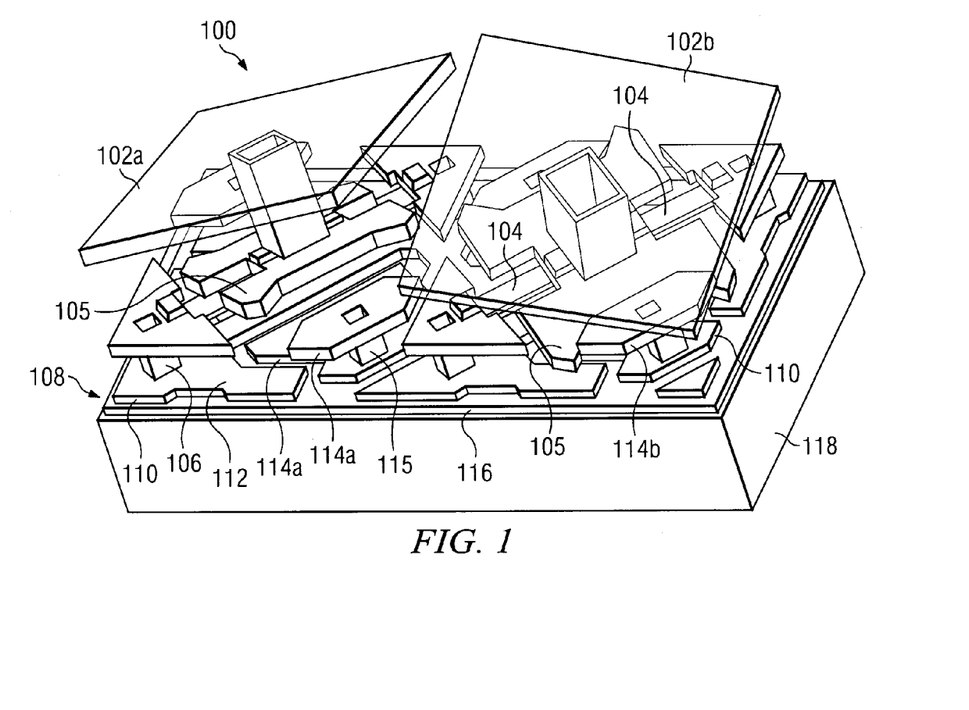
FIG. 1 is a perspective view of a portion of an example semiconductor device in accordance with a particular embodiment of the present disclosure.

FIG. 1 illustrates a perspective view of a portion of digital micromirror device 100. In the illustrated embodiment, DMD 100 includes an array of hundreds of thousands of micromirrors 102 encased within a hermetic package formed by a ceramic header and a transparent window (not explicitly shown). Each micromirror 102 may tilt up to plus or minus twelve degrees, for example, creating an active "on" state condition or an active "off" state condition. Each micromirror 102 transitions between its active "on" and "off" states to selectively communicate at least a portion of an optical signal or light beam. To permit micromirrors 102 to tilt, each micromirror 102 is attached to a respective hinge 104 mounted on a hinge post 106, and spaced by means of an air gap over support structures 108. In various embodiments, a thin anti-reflective layer (e.g., anti-reflective layer 208 of FIG. 2C) may be formed outwardly from portions of the support structures 108, including sidewalls 110, as explained further below.

Micromirrors 102 tilt in the positive or negative direction as a result of preferential electrostatic forces between a micromirror 102 and at least one of its corresponding electrodes 114. In this example, a yoke 105 increases the electrostatic forces acting on micromirror 102 and stops micromirror 102 rotation by contacting conductive conduits 112. Although this example includes yoke 105, other examples may eliminate yoke 105. In those examples, micromirrors 102 may tilt in the positive or negative direction until micromirrors 102 contact a suitable mirror stop (not explicitly shown).

In this particular example, support structures 108 form an arrangement having electrically-isolated conductive conduit 112 portions and electrode 114 portions. In addition, support structures 108 are multi-layered etched-metallic structures encased within one or more anti-reflective layers and disposed outwardly from a dielectric layer 116, as explained further below. Dielectric layer 116 operates to isolate support structures 108 from a substrate 118.

In this particular example, substrate 118 comprises the control circuitry associated with DMD 100. The control circuitry may include any hardware, software, firmware, or combination thereof capable of at least partially contributing to the creation of the electrostatic forces between electrodes 114 and micromirrors 102. The control circuitry associated with substrate 118 functions to selectively transition micromirrors 102 between "on" state and "off" state based at least in part on data received from a processor (not explicitly shown).

Substrate 118 and support structures 108 typically comprise one or more layers of metals and dielectrics that may be optically reflective. During operation of various embodiments, portions of substrate 118 and support structures 108, including sidewalls 110, may be exposed to incident radiation, referred to herein as "stray radiation," due to the tilting of micromirrors 102 and the gaps between micromirrors 102. In conventional DMDs, this stray radiation may result in unwanted reflections that may reduce the image quality produced by the DMD.

Accordingly, the teachings of some embodiments of the disclosure recognize methods of disposing a thin anti-reflective layer along the reflective surfaces of support structure 108, including, for example, sidewalls 110. In other embodiments, an anti-reflective "blanket" may be formed outwardly from dielectric layer 116 between support structures 108, thereby mitigating or eliminating stray radiation from optically reflective surfaces within substrate 118. The principles applied to DMD 100 may be used as a basis for forming any of a variety of semiconductor devices, including optical devices, such as a spatial light modulator, a gain equalizer, an optical filter, or combination of these or other optical devices. Methods for manufacturing a semiconductor device in accordance with the teachings of various embodiments of the present disclosure are illustrated in FIGS. 2A through 6B.

FIGS. 2A through 2D illustrate one example of a method of forming a portion of DMD 100 of FIG. 1 that selectively removes portions of an anti-reflective layer 208 and an outwardly disposed capping layer 210 disposed between support structures 108 in separate process steps.

Figure 2A:
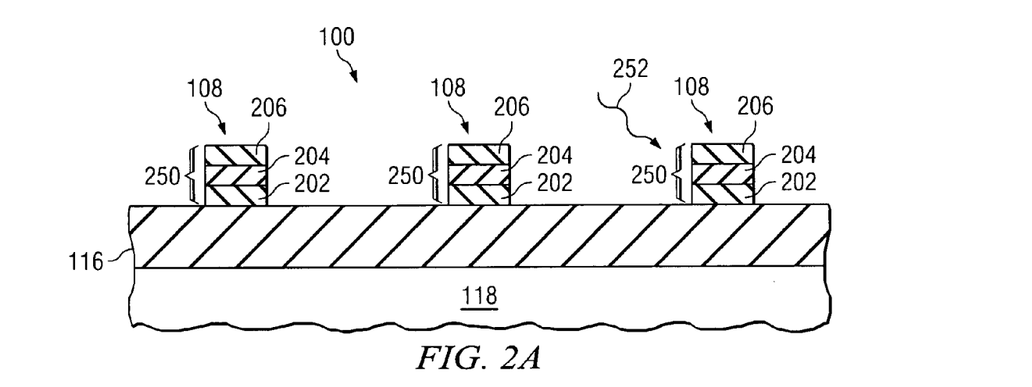
FIGS. 2A through 2D illustrate one example of a method of forming a portion of the semiconductor device of FIG. 1 that selectively removes portions of an anti-reflective layer and an outwardly disposed capping layer disposed between support structures in separate process steps.

FIG. 2A shows a cross-sectional view of a portion of DMD 100 after the formation of dielectric layer 116 outwardly from substrate 118, and after the formation of support structures 108 at laterally spaced intervals disposed outwardly from dielectric layer 116.

Substrate 118 may comprise any suitable material used in semiconductor chip fabrication, such as silicon, poly-silicon, indium phosphide, germanium, or gallium arsenide. In various embodiments, substrate 118 can include complementary metal-oxide semiconductor (CMOS) circuitry capable of controlling DMD 100 after its formation. In one non-limiting example, the CMOS circuitry may comprise a CMOS memory circuit, such as, for example, a 5 T or 6 T SRAM cell.

Dielectric layer 116 acts to electrically isolate support structures 108 from substrate 118. Dielectric layer 116 may be formed from any dielectric material suitable for use in semiconductor manufacturing, such as TEOS oxide, HDP oxide, or any suitable combination of dielectrics. In addition, dielectric layer 116 may have any suitable thickness, such as approximately 10,000 angstroms, and may be formed in any suitable manner. Such suitable deposition techniques include, but are not limited to, sputtering, chemical vapor deposition, plasma-enhanced chemical vapor deposition, and spin-coating. In some cases, dielectric layer 116 can be planarized, such as by using a chemical mechanical polish (CMP) technique, to provide a relatively flat surface.

Support structures 108 are each generally operable to provide a stable base and conductive conduits for respectively coupled electromechanical components, such as, for example, hinge posts 106 and electrode posts 115 of FIG. 1. Support structures 108 may have any suitable arrangement and include any suitable number of layers (e.g., layers 202, 204, and 206). In addition, support structures 108 may be composed of any suitable material. For example, each layer 202, 204, and 206 may be respectively formed from aluminum or an aluminum alloy, copper, silver, gold, tungsten, titanium, titanium nitride (TiN), silicon, polysilicon, carbon, chromium, and nickel and/or a combination of these or other suitable materials. Support structure 108 may have any suitable thickness, such as approximately 5,000 angstroms, and may be formed in any suitable manner, such as deposition. Such suitable deposition techniques include, but are not limited to, sputtering, chemical vapor deposition, plasma-enhanced chemical vapor deposition, and spin-coating.

Figure 2B:
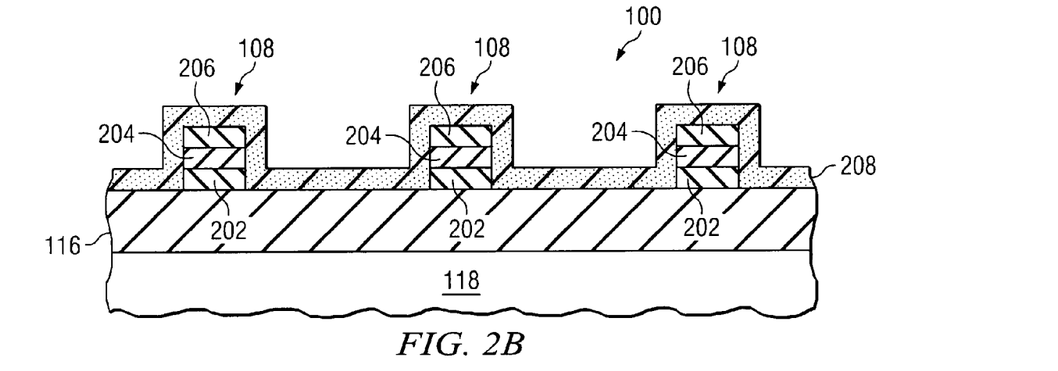

In this particular embodiment, plural layers 202, 204, and 206 were previously deposited and collectively patterned and etched in the approximate arrangement of support structures 108 of FIG. 1. As shown in FIG. 2A, support structures 108 include sidewalls 250 that are substantially perpendicular to the surface of dielectric layer 116. In various embodiments, sidewalls 250 may be highly reflective and positioned within the pathway of potential stray radiation, as illustrated by beam 252. As shown in FIG. 2B, an anti-reflective layer 208 may make the use of more reflective materials possible for layer(s) 202, 204, and 206 by covering exposed support structure 108 surfaces, including sidewalls 250, with a light absorptive material.

FIG. 2B shows a cross-sectional view of a portion of the DMD 100 of FIG. 2A after the formation of a anti-reflective layer 208 outwardly from support structures 108 and dielectric layer 116. Although anti-reflective layer 208, support structures 108, and dielectric layer 116 are shown as being formed without interstitial layers between them, such interstitial could alternatively be formed without departing from the scope of the present disclosure.

Anti-reflective layer 208 generally has an index of refraction greater than the minimum index of refraction of the material(s) forming the surfaces, including sidewalls 250, of support structures 108. In this example, anti-reflective layer 208 ideally has an index of refraction greater than approximately 1.5, thereby potentially enhancing DMD 100 optical performance. Anti-reflective layer 208 may be formed, for example, by sputter depositing a titanium nitride (TiN) layer to a thickness that is less than the total thickness of support structures 108; however, any suitable material, processing, or thickness may be used. For example, anti-reflective layer may alternatively be formed from an aluminum alloy, tungsten, titanium, nitrogen, silicon, polysilicon, carbon, chromium, nickel, or any appropriate combination of the proceeding.

In various embodiments, anti-reflective layer 208 may be non-conductive. For example, anti-reflective layer 208 may be formed from silicon oxynitrides, silicon nitrides, anti-reflection coating (ARC) oxide, and/or other materials with similar refractive index. Additionally, in various embodiments anti-reflective layer 208 may be formed from material substantially similar to the material forming dielectric layer 116. In some such embodiments, dielectric layer 116 and ant-reflective layer 208 may comprise the same material. A non-conductive anti-reflective layer 208 will not electrically connect support structures 108 and thus will not short electrodes 114 to conductive conduits 112. Accordingly, some such embodiments may not include the selective removal between support structures 108 described below with reference to FIG. 2C. Such embodiments may or may not alternatively proceed to processes similar to those described in FIG. 2D.

Figure 2C:
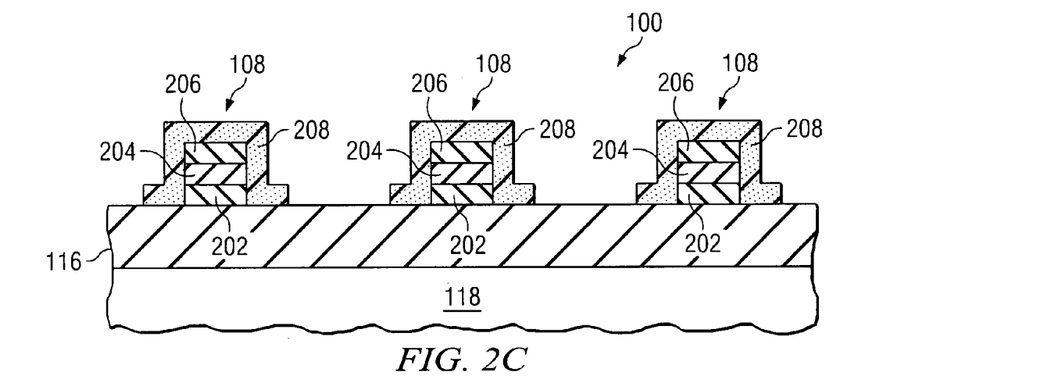

FIG. 2C shows a cross-sectional view of a portion of the DMD 100 of FIG. 2B after selectively removing a portion of anti-reflective layer 208. The selective removal may be effected using any suitable semiconductor process(es). For example, patterning and etching processes may selectively remove portions of anti-reflective layer 208 disposed outwardly from dielectric layer 116 centrally in the intervals between support structures 108, as shown in FIG. 2C. In this particular embodiment, "oversized" patterning followed by etching left other portions of the anti-reflective layer 208 disposed outwardly from the sidewalls 205 and top outward surfaces of support structures 208. In this manner, each electromechanical support structure 108 remains encased within a respective portion of anti-reflective layer 208.

Figure 2D:
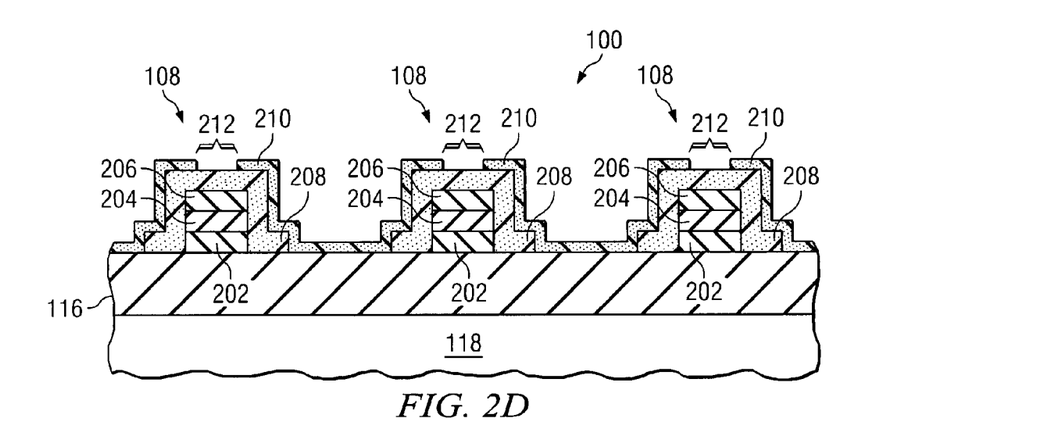

FIG. 2D shows a cross-sectional view of a portion of the DMD 100 of FIG. 2C after the formation and selective removal of a capping layer 210 outwardly from anti-reflective layer 208 and dielectric layer 116. Various embodiments may not include capping layer 210. In this example, however, capping layer 210 is formed by depositing anti-reflection coating (ARC) oxide to any suitable thickness, followed by patterning and etching processes; however, any suitable processes or materials may be used. In this manner, support structure 108 sidewalls 250 may be disposed inwardly from an anti-reflective layer 208 and a capping layer 210. In some embodiments, capping layer 210 may itself have anti-reflective properties.

As shown in FIG. 2D, some selectively removed portions 212 of capping layer 210 may expose corresponding outward surfaces of anti-reflective layer 208, which is disposed outwardly from support structures 108. At some point, some such exposed anti-reflective layer 208 surfaces may later couple to corresponding electromechanical components, such as, for example, hinge posts 106.

Various alternative embodiments may selectively remove portions differing from, or in addition to, the selectively removed portions 212 illustrated in FIG. 2D and the selectively removed portions of anti-reflective layer 208 between support structures 108 illustrated in FIG. 2C. For example, as described previously, some embodiments may not selectively remove any portion of a non-conductive, anti-reflective layer 208 disposed between support structures 108.

In addition, some such alternative embodiments may selectively remove portions of anti-reflective layer 208 disposed inwardly from the portions 212 of capping layer 210. In various embodiments, such additional selective removal may be effected in the same process steps. At some point, some such exposed support structure 108 surfaces, (e.g., the outer surface of layer 206), may later couple to corresponding electromechanical components, such as, for example, hinge posts 106.

Accordingly, teachings of some embodiments of the present disclosure may encase sidewalls 250 of support structures 108 and still maintain conventional material interfaces between support structures 108 and outwardly disposed electromechanical components.

Figure 3A:
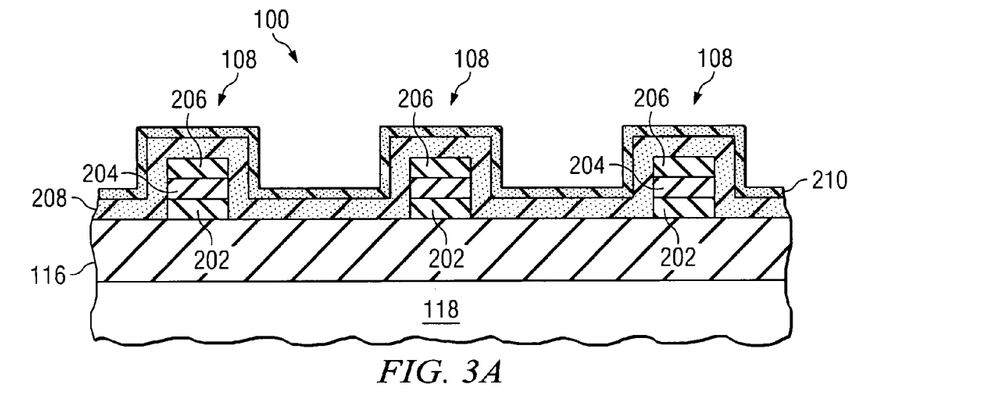
FIGS. 3A through 3C illustrate one alternative example of a method of forming a portion of the semiconductor device of FIG. 1 that selectively removes portions of an anti-reflective layer and a capping layer disposed between support structures in the same process steps.
Figure 3B:
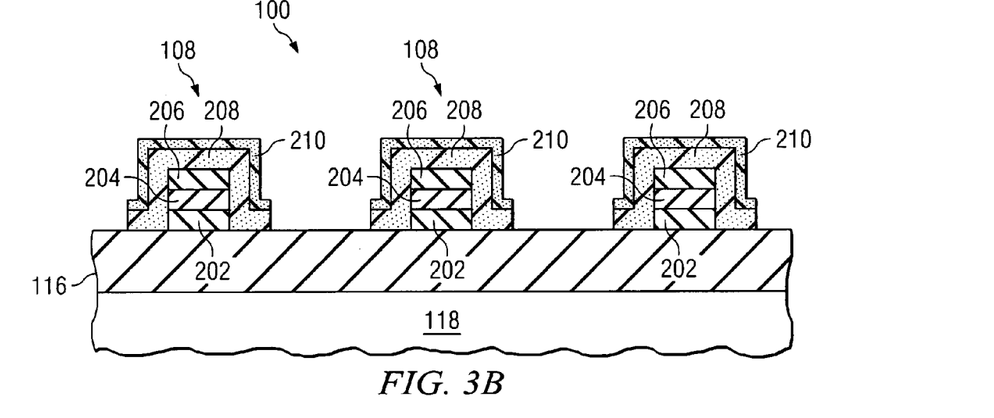
Figure 3C:
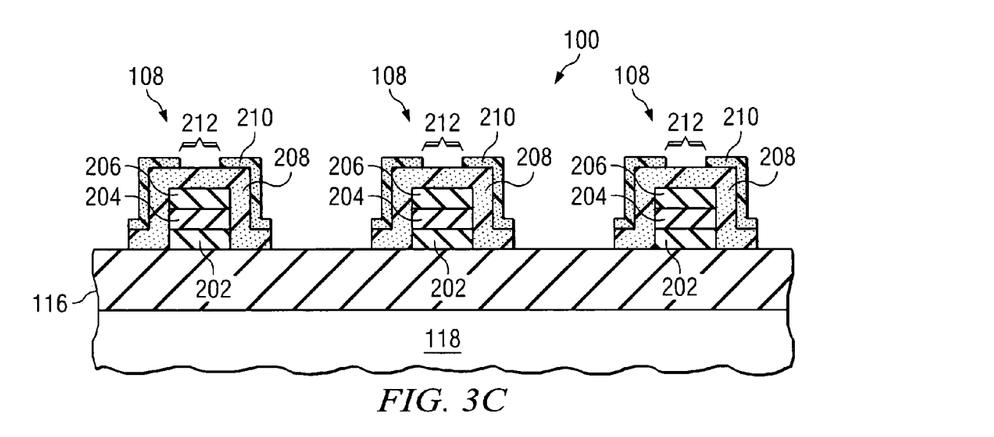

FIGS. 3A through 3C illustrate an alternative example of a method of forming a portion of the DMD 100 of FIG. 2B that selectively removes portions of an anti-reflective layer 208 and a capping layer 210 disposed between support structures 108 in the same process steps.

FIG. 3A shows a cross-sectional view of a portion of DMD 100 of FIG. 2B after the formation of capping layer 210 outwardly from anti-reflective layer 208. Although anti-reflective layer 208 and capping layer 210 are shown as being formed without interstitial layers between them, such interstitial could alternatively be formed without departing from the scope of the present disclosure. Various embodiments may not include capping layer 210. In this example, however, capping layer 210 is formed by depositing ARC oxide to any suitable thickness; however, any suitable processes or materials may be used.

FIG. 3B shows a cross-sectional view of a portion of the DMD 100 of FIG. 3A after selectively removing a portion of anti-reflective layer 208 and capping layer 210 during the same process steps. The selective removal may be effected using any suitable semiconductor process(es). For example, patterning and etching processes may selectively remove portions of anti-reflective layer 208 and capping layer 210 disposed outwardly from dielectric layer 116 between support structures 108, as shown in FIG. 3B.

In this particular embodiment, "oversized" patterning followed by etching left portions of the anti-reflective layer 208 and capping layer disposed outwardly from the sidewalls 205 and top outward surface of support structures 208. In this manner, each electromechanical structure 108 remains encased within a respective portion of anti-reflective layer 208 and capping layer 210. This particular embodiment differs from the example embodiments previously described with reference to FIGS. 2A through 2D in that the patterning and etching of anti-reflective layer 208 and capping layer 210 of FIG. 3B, in the same process steps, has removed most of the capping layer 210 portions between electromechanical elements 108.

FIG. 3C shows a cross-sectional view of a portion of the DMD 100 of FIG. 3B after selectively removing portions of capping layer 210 disposed outwardly from anti-reflective layer 208 and support structures 108. Some selectively removed portions 212 of capping layer 210 may expose corresponding outward surfaces of anti-reflective layer 208, which is disposed outwardly from support structures 108. At some point, some such exposed anti-reflective layer surfaces may later couple to corresponding electromechanical components, such as, for example, hinge posts 106.

Various alternative embodiments may selectively remove portions differing from, or in addition to, the selectively removed portions 212 illustrated in FIG. 3C 2D and the selectively removed portions of anti-reflective reflective layer 208 between support structures 108 illustrated in FIG. 3B. For example, some embodiments using the non-conductive, anti-reflective layer 208 described previously may selectively remove portions of capping layer 210 disposed between support structures 108 without selectively removing inwardly disposed portions of anti-reflective layer 208.

In addition, some such alternative embodiments may selectively remove portions of anti-reflective layer 208 disposed inwardly from the selectively removed portions 212 of capping layer 210. In various embodiments, such additional selective removal may be effected in the same process steps. At some point, some such exposed support structure 108 surfaces, (e.g., the outer surface of layer 206), may later couple to corresponding electromechanical components, such as, for example, hinge posts 106.

Figure 4A:
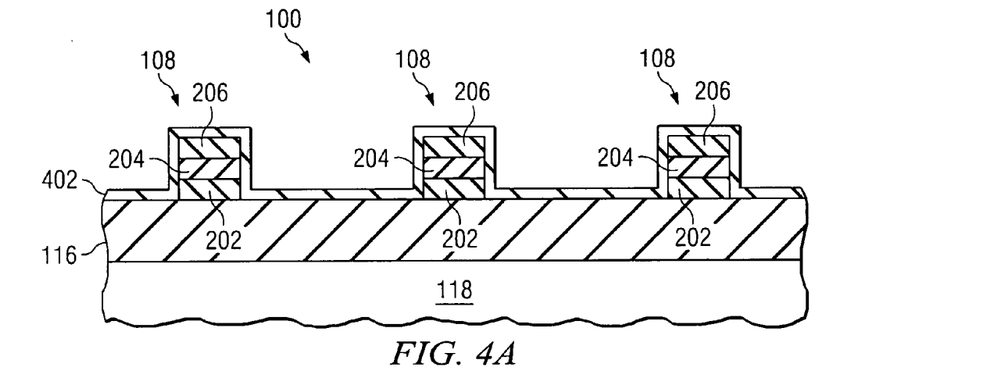
FIGS. 4A through 4C illustrate one example of a method of forming a portion of the semiconductor device of FIG. 1 with an anti-reflective "blanket" capable of covering sidewalls and inwardly disposed metal lines.
Figure 4B:
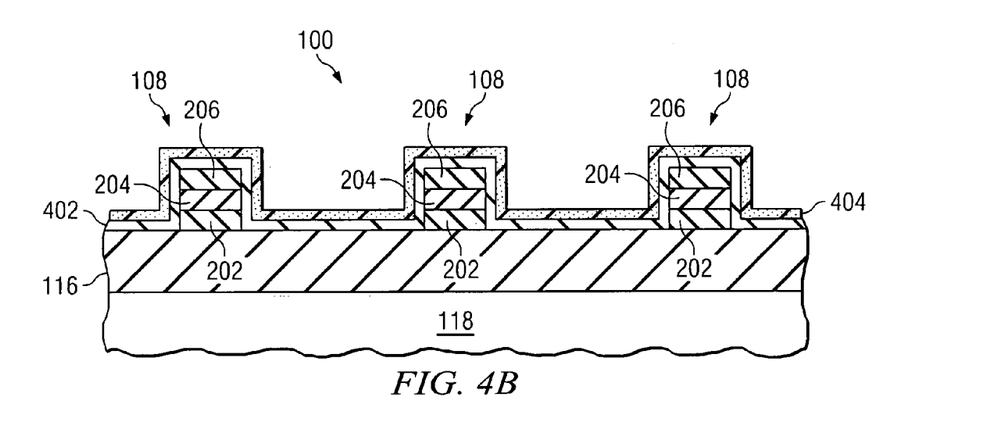
Figure 4C:
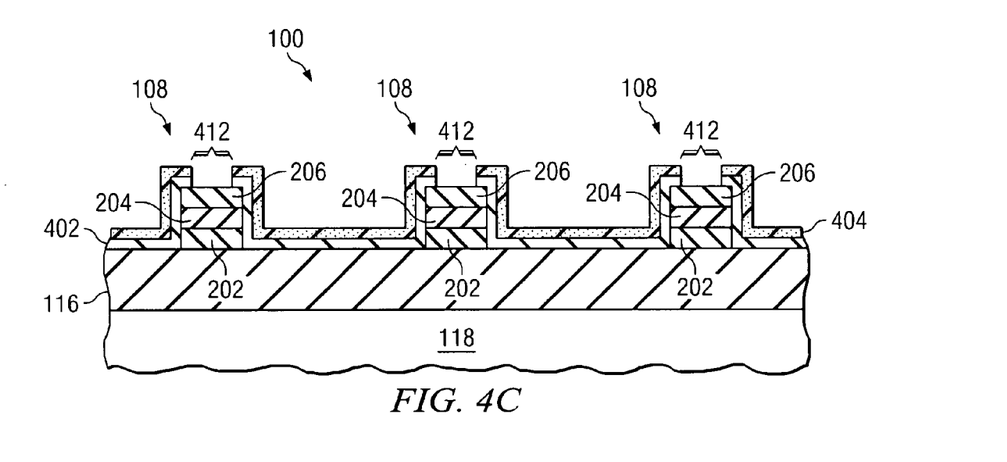

FIGS. 4A through 4C illustrate one example of a method of forming a portion of DMD 100 of FIG. 1 with an anti-reflective "blanket" capable of covering sidewalls and inwardly disposed metal lines;

FIG. 4A shows a cross-sectional view of a portion of DMD 100 of FIG. 1 after the formation of dielectric layer 116 outwardly from substrate 118, after the formation of support structures 108 outwardly from dielectric layer 116, and after the formation of another dielectric layer 402 outwardly from support structures 108. In this particular example, support structures 108, dielectric layer 116, and substrate 118 are substantially similar in structure and function to corresponding elements of FIG. 2B. Dielectric layer 402 may be formed, for example, by depositing ARC oxide to any suitable thickness; however, any suitable dielectric may be used.

FIG. 4B shows a cross-sectional view of a portion of DMD 100 of FIG. 4A after the formation of an anti-reflective layer 404 outwardly from dielectric layer 402. Although anti-reflective layer 404 and dielectric layer 402 are shown as being formed without interstitial layers between them, such interstitial could alternatively be formed without departing from the scope of the present disclosure.

Anti-reflective layer 404 generally has an index of refraction greater than the minimum index of refraction of the material(s) forming the surfaces, including sidewalls 250, of support structures 108. In this example, anti-reflective layer 404 ideally has an index of refraction greater than approximately 1.5, thereby potentially enhancing DMD 100 optical performance. Anti-reflective layer 404 may be formed, for example, by sputter depositing a TiN layer to a thickness that is less than the total thickness of support structures 108; however, any suitable material, processing, or thickness may be used. If anti-reflective layer 404 is conductive, dielectric layer 402 may insulate anti-reflective layer 404 from support structures 108. In this manner, electrodes 114 will not short to conductive conduits 112.

This particular example differs from the example embodiments described with reference to FIGS. 2A through 2D and the example embodiments described with reference to FIGS. 3A through 3C in that greater portions of the anti-reflective layer 404 may be left within the trench between support structures 108. Accordingly, in some embodiments of the present disclosure, anti-reflective layer 404 may effectively "blanket" or encase support structures 108 and completely cover reflective metal lines formed within substrate 118 that might otherwise have been exposed to stray radiation.

FIG. 4C shows a cross-sectional view of a portion of the DMD 100 of FIG. 4B after selectively removing portions 412 of dielectric layer 402 and anti-reflective layer 404 disposed outwardly from support structure 108. In this particular example, selectively removed portions 412 may expose corresponding outward surfaces of support structures 108. At some point, some such exposed surfaces may later couple to corresponding electromechanical components, such as, for example, hinge posts 106 and electrode posts 115.

Figure 5A:
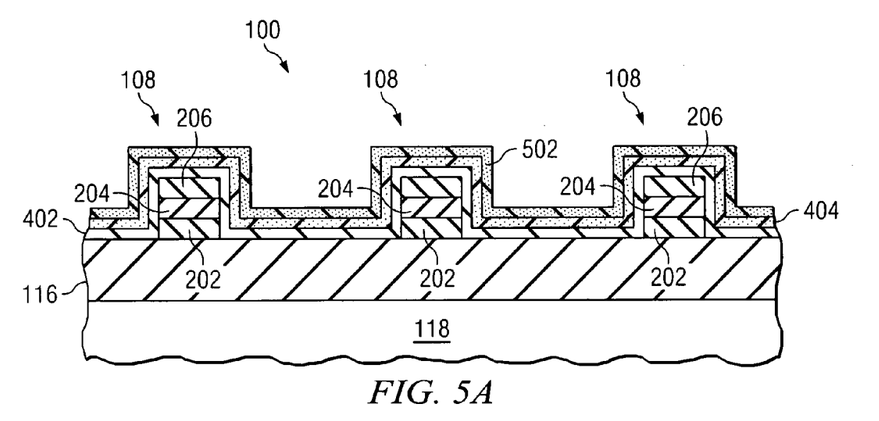
FIGS. 5A and 5B illustrate one alternative example of a method of forming a portion of the semiconductor device of FIG. 1 with a capping layer formed outwardly from an anti-reflective "blanket.
Figure 5B:
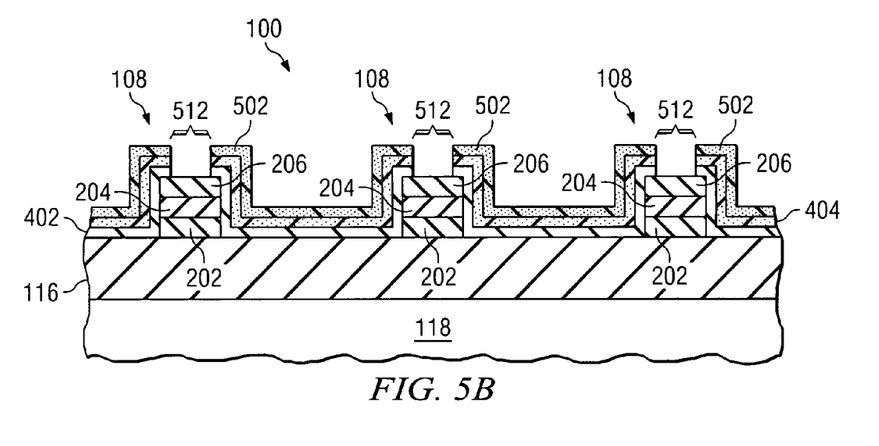

FIGS. 5A and 5B illustrate one alternative example of a method of forming a portion of DMD 100 of FIG. 4B with a capping layer 502 formed outwardly from an anti-reflective "blanket" capable of covering sidewalls and inwardly disposed metal lines.

FIG. 5A shows a cross-sectional view of a portion of the DMD 100 of FIG. 4B after the formation of a capping layer 502 outwardly from anti-reflective layer 404. In this example, capping layer 502 is formed by depositing ARC oxide to any suitable thickness; however any suitable processes or materials may be used.

FIG. 5B shows a cross-sectional view of a portion of the DMD 100 of FIG. 5A after selectively removing portions 512 of capping layer 502, anti-reflective layer 404, and dielectric layer 402. In this particular example, selectively removed portions 512 may expose corresponding outward surfaces of support structures 108. At some point, some such exposed surfaces may later couple to corresponding electromechanical components, such as, for example, hinge posts 106 and electrode posts 115.

Figure 6A:
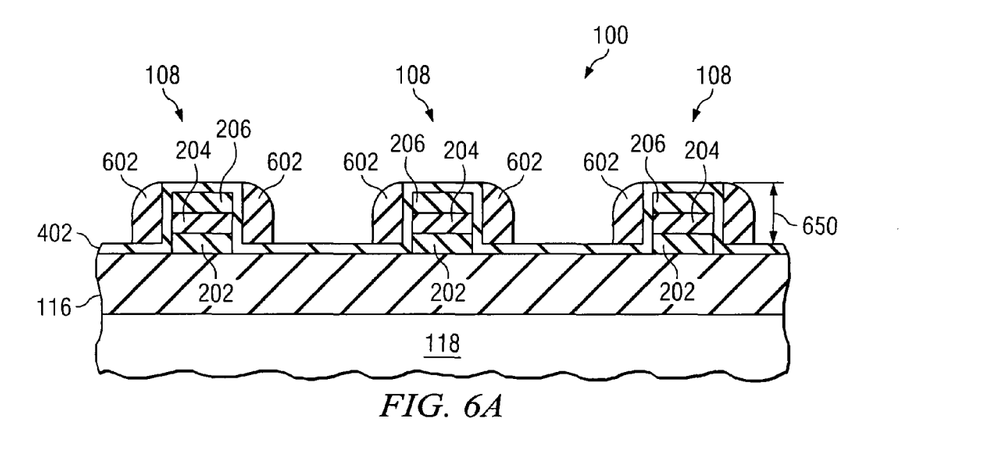
" and FIGS. 6A and 6B illustrate an alternative embodiment of forming a portion of the semiconductor device of FIG. 1 with sloped anti-reflective sidewalls.
Figure 6B:
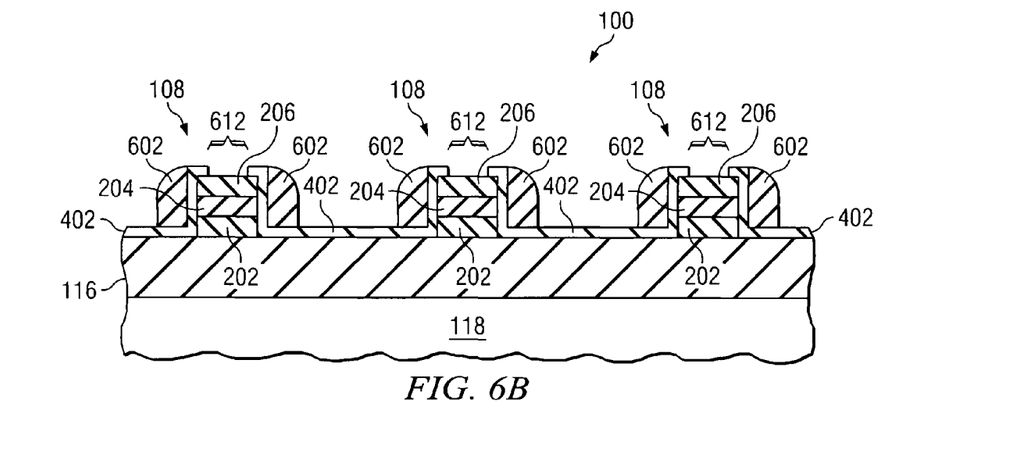

FIGS. 6A and 6B illustrate an alternative embodiment of forming a portion of DMD 100 of FIG. 1 with sloped anti-reflective sidewalls 602.

FIG. 6A shows a cross-sectional view of a portion of the DMD 100 of FIG. 4A after forming anti-reflective sidewalls 602. Forming anti-reflective sidewalls 602 may be effected by any of a variety of processes and materials. In one non-limiting example, a sidewall oxide or sidewall nitride deposition may be followed by an anisotropic etch. In this manner, anti-reflective sidewall 602 may be disposed outwardly from sidewalls 250 of support structures 108, but not necessarily outwardly from the upper surface of support structures 108.

FIG. 6B shows a cross-sectional view of a portion of the DMD 100 of FIG. 6A after selectively removing portions 612 of dielectric layer 402. In this particular example, selectively removed portions 612 may expose corresponding outward surfaces of support structures 108. At some point, some such exposed surfaces may later couple to corresponding electromechanical components, such as, for example, hinge posts 106 and electrode posts 115. Accordingly, the example embodiment illustrated in FIGS. 6A through 6B may be effected with minimal and cost-effective changes to conventional process flows.

Thus, FIGS. 2A through 6B provide enhanced and cost-effective methods for manufacturing a portion of semiconductor device 100 in accordance with the teachings of various embodiments of the present disclosure. Subsequent semiconductor processing techniques well known in the art may than be utilized to complete DMD 100 by forming the superstructure of DMD 100 including, without limitation, hinge posts 106, remaining electrodes 112, hinges 104, and micromirrors 102.

The present disclosure describes various systems and methods that mitigate the detrimental optical effects of stray radiation using thin anti-reflective layer(s). In some embodiments, the relative thinness of the anti-reflective layer(s) may enable minimal process or design changes for subsequent levels of DMD processing. For example, various embodiments may be implemented with minimal adjustments of the distance between micromirrors 102 and substrate 118 compared to conventional designs and processes. In addition, various embodiments may enable the use of more reflective material that may be encased within anti-reflective layer(s) or otherwise "hidden" beneath an anti-reflective "blanket," as previously described. In various embodiments, such layers may also provide protection against corrosion and electrical shorts.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method of manufacturing a semiconductor device comprising:

providing a substrate;

forming a dielectric layer over the substrate;

forming conductive support structures for elements of a microelectromechanical system (MEMS) device at laterally spaced intervals and disposed outwardly from the dielectric layer;

forming an anti-reflective layer by blanket deposition over the support structures and dielectric layer, the anti-reflective layer having an index of refraction greater than a minimum index of refraction of materials forming surfaces, including sidewalls, of the support structures;

selectively removing portions of the anti-reflective layer from over the dielectric layer centrally in the intervals between the support structures, leaving other portions of the anti-reflective layer remaining over the sidewalls and top surfaces of the support structures, respective ones of the remaining portions encasing corresponding ones of the support structures;

forming an anti-reflective coating (ARC) oxide layer over the remaining portions of the anti-reflective layer; and selectively removing portions of the ARC oxide layer to expose corresponding portions of the support structure top surfaces for conductive contact with the MEMS device elements.

2. The method of claim 1, wherein the ARC oxide layer is formed by blanket deposition over the dielectric layer and remaining portions of the anti-reflective layer.

3. The method of claim 2, wherein the anti-reflective layer comprises titanium nitride.

4. The method of claim 3, wherein the conductive support structures comprise aluminum.

5. The method of claim 4, wherein the support structures are support structures for hinge posts or electrode posts of a micromirror device.

6. The method of claim 2, wherein the anti-reflective layer has an index of refraction greater than approximately 1.5.

7. The method of claim 2, wherein the support structures are support structures for hinge posts or electrode posts of a micromirror device.

8. The method of claim 1, wherein the anti-reflective layer comprises titanium nitride.

9. The method of claim 1, wherein the support structures comprise aluminum.

10. The method of claim 1, wherein the support structures are support structures for hinge posts or electrode posts of a micromirror device.

11. The method of claim 1, wherein the anti-reflective layer has an index of refraction greater than approximately 1.5.

* * * * *